United States Patent
Eliaz et al.

(10) Patent No.: US 9,118,519 B2
(45) Date of Patent: Aug. 25, 2015

(54) RECEPTION OF INTER-SYMBOL-CORRELATED SIGNALS USING SYMBOL-BY-SYMBOL SOFT-OUTPUT DEMODULATOR

(71) Applicant: MagnaCom Ltd., Petach Tikva (IL)

(72) Inventors: Amir Eliaz, Moshav Ben Shemen (IL); Ilan Reuven, Ganey Tikva (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/522,826

(22) Filed: Oct. 24, 2014

(65) Prior Publication Data
US 2015/0124912 A1    May 7, 2015

Related U.S. Application Data

(60) Provisional application No. 61/898,997, filed on Nov. 1, 2013.

(51) Int. Cl.
| | | |
|---|---|---|
| *H04L 25/03* | (2006.01) | |
| *H04L 1/00* | (2006.01) | |
| *H04M 11/06* | (2006.01) | |
| *H04L 25/06* | (2006.01) | |

(52) U.S. Cl.
CPC ........ *H04L 25/03305* (2013.01); *H04L 1/0054* (2013.01); *H04M 11/06* (2013.01); *H04M 11/062* (2013.01); *H04L 25/067* (2013.01)

(58) Field of Classification Search
CPC ..... H04L 1/0054; H04L 25/067; H04M 1/06; H04M 1/062
See application file for complete search history.

(56) References Cited

U.S. PATENT DOCUMENTS

| | | |
|---|---|---|
| 4,109,101 A | 8/1978 | Mitani |
| 4,135,057 A | 1/1979 | Bayless, Sr. et al. |
| 4,797,925 A | 1/1989 | Lin |
| 5,111,484 A * | 5/1992 | Karabinis ................ 375/340 |
| 5,131,011 A | 7/1992 | Bergmans et al. |
| 5,202,903 A | 4/1993 | Okanoue |
| 5,249,200 A | 9/1993 | Chen et al. |
| 5,283,813 A | 2/1994 | Shalvi et al. |

(Continued)

FOREIGN PATENT DOCUMENTS

WO     2013030815 A1     3/2013

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Leon-Viet Nguyen
(74) *Attorney, Agent, or Firm* — McAndrews Held & Malloy, Ltd.

(57) ABSTRACT

A receiver comprises a sequence estimation circuit and a soft-input-soft-output (SISO) decoder. The sequence estimation circuit comprises circuitry operable to generate first soft bit decisions for symbols of a received inter-symbol-correlated signal. The SISO decoder comprises circuitry operable to decode the first soft bit decisions to generate corrected soft bit decisions. The circuitry of the sequence estimation circuit is operable to generate, based on the corrected soft bit decisions, second soft bit decisions for the symbols of the received inter-symbol-correlated signal, which are improved/refined relative to the first soft bit decisions.

28 Claims, 7 Drawing Sheets

(56) References Cited

U.S. PATENT DOCUMENTS

| | | |
|---|---|---|
| 5,291,516 A | 3/1994 | Dixon et al. |
| 5,394,439 A | 2/1995 | Hemmati |
| 5,432,822 A | 7/1995 | Kaewell, Jr. |
| 5,459,762 A | 10/1995 | Wang et al. |
| 5,590,121 A | 12/1996 | Geigel et al. |
| 5,602,507 A | 2/1997 | Suzuki |
| 5,757,855 A | 5/1998 | Strolle et al. |
| 5,784,415 A | 7/1998 | Chevillat et al. |
| 5,818,653 A | 10/1998 | Park et al. |
| 5,886,748 A | 3/1999 | Lee |
| 5,889,823 A | 3/1999 | Agazzi et al. |
| 5,915,213 A | 6/1999 | Iwatsuki et al. |
| 5,930,309 A | 7/1999 | Knutson et al. |
| 6,009,120 A | 12/1999 | Nobakht |
| 6,167,079 A | 12/2000 | Kinnunen et al. |
| 6,233,709 B1 | 5/2001 | Zhang et al. |
| 6,272,173 B1 | 8/2001 | Hatamian |
| 6,335,954 B1 | 1/2002 | Bottomley et al. |
| 6,356,586 B1 | 3/2002 | Krishnamoorthy et al. |
| 6,516,437 B1 | 2/2003 | Van Stralen et al. |
| 6,532,256 B2 | 3/2003 | Miller |
| 6,535,549 B1 | 3/2003 | Scott et al. |
| 6,690,754 B1 | 2/2004 | Haratsch et al. |
| 6,697,441 B1 | 2/2004 | Bottomley et al. |
| 6,785,342 B1 | 8/2004 | Isaksen et al. |
| 6,871,208 B1 | 3/2005 | Guo et al. |
| 6,968,021 B1 | 11/2005 | White et al. |
| 6,985,709 B2 | 1/2006 | Perets |
| 7,158,324 B2 | 1/2007 | Stein et al. |
| 7,190,288 B2 | 3/2007 | Robinson et al. |
| 7,190,721 B2 | 3/2007 | Garrett |
| 7,205,798 B1 | 4/2007 | Agarwal et al. |
| 7,206,363 B2 | 4/2007 | Hegde et al. |
| 7,215,716 B1 | 5/2007 | Smith |
| 7,269,205 B2 | 9/2007 | Wang |
| 7,467,338 B2 | 12/2008 | Saul |
| 7,830,854 B1 | 11/2010 | Sarkar et al. |
| 7,974,230 B1 | 7/2011 | Talley et al. |
| 8,005,170 B2 | 8/2011 | Lee et al. |
| 8,059,737 B2 | 11/2011 | Yang |
| 8,175,186 B1 | 5/2012 | Wiss et al. |
| 8,199,804 B1 | 6/2012 | Cheong |
| 8,248,975 B2 | 8/2012 | Fujita et al. |
| 8,351,536 B2 | 1/2013 | Mazet et al. |
| 8,422,589 B2 | 4/2013 | Golitschek Edler Von Elbwart et al. |
| 8,526,523 B1 | 9/2013 | Eliaz |
| 8,548,072 B1 | 10/2013 | Eliaz |
| 8,548,089 B2 | 10/2013 | Agazzi et al. |
| 8,548,097 B1 | 10/2013 | Eliaz |
| 8,553,821 B1 | 10/2013 | Eliaz |
| 8,559,494 B1 | 10/2013 | Eliaz |
| 8,559,496 B1 | 10/2013 | Eliaz |
| 8,559,498 B1 | 10/2013 | Eliaz |
| 8,565,363 B1 | 10/2013 | Eliaz |
| 8,566,687 B1 | 10/2013 | Eliaz |
| 8,571,131 B1 | 10/2013 | Eliaz |
| 8,571,146 B1 | 10/2013 | Eliaz |
| 8,572,458 B1 | 10/2013 | Eliaz |
| 8,582,637 B1 | 11/2013 | Eliaz |
| 8,599,914 B1 | 12/2013 | Eliaz |
| 8,605,832 B1 | 12/2013 | Eliaz |
| 8,665,941 B1 | 3/2014 | Eliaz |
| 8,665,992 B1 | 3/2014 | Eliaz |
| 8,666,000 B2 | 3/2014 | Eliaz |
| 8,675,769 B1 | 3/2014 | Eliaz |
| 8,675,782 B2 | 3/2014 | Eliaz |
| 8,681,889 B2 | 3/2014 | Eliaz |
| 8,737,458 B2 | 5/2014 | Eliaz |
| 8,744,003 B2 | 6/2014 | Eliaz |
| 8,781,008 B2 | 7/2014 | Eliaz |
| 8,804,879 B1 | 8/2014 | Eliaz |
| 8,811,548 B2 | 8/2014 | Eliaz |
| 8,824,572 B2 | 9/2014 | Eliaz |
| 8,824,599 B1 | 9/2014 | Eliaz |
| 8,824,611 B2 | 9/2014 | Eliaz |
| 8,831,124 B2 | 9/2014 | Eliaz |
| 8,842,778 B2 | 9/2014 | Eliaz |
| 8,873,612 B1 | 10/2014 | Eliaz |
| 8,885,698 B2 | 11/2014 | Eliaz |
| 8,885,786 B2 | 11/2014 | Eliaz |
| 8,891,701 B1 | 11/2014 | Eliaz |
| 8,897,387 B1 | 11/2014 | Eliaz |
| 8,897,405 B2 | 11/2014 | Eliaz |
| 2001/0008542 A1 | 7/2001 | Wiebke et al. |
| 2002/0016938 A1 | 2/2002 | Starr |
| 2002/0123318 A1 | 9/2002 | Lagarrigue |
| 2002/0150065 A1 | 10/2002 | Ponnekanti |
| 2002/0150184 A1 | 10/2002 | Hafeez et al. |
| 2002/0172297 A1 | 11/2002 | Ouchi et al. |
| 2003/0016741 A1 | 1/2003 | Sasson et al. |
| 2003/0135809 A1 | 7/2003 | Kim |
| 2003/0210352 A1 | 11/2003 | Fitzsimmons et al. |
| 2004/0037374 A1 | 2/2004 | Gonikberg |
| 2004/0086276 A1 | 5/2004 | Lenosky |
| 2004/0120409 A1 | 6/2004 | Yasotharan et al. |
| 2004/0142666 A1 | 7/2004 | Creigh et al. |
| 2004/0170228 A1 | 9/2004 | Vadde |
| 2004/0174937 A1 | 9/2004 | Ungerboeck |
| 2004/0203458 A1 | 10/2004 | Nigra |
| 2004/0227570 A1 | 11/2004 | Jackson et al. |
| 2004/0240578 A1 | 12/2004 | Thesling |
| 2004/0257955 A1 | 12/2004 | Yamanaka |
| 2005/0047517 A1 | 3/2005 | Georgios et al. |
| 2005/0123077 A1 | 6/2005 | Kim |
| 2005/0135472 A1 | 6/2005 | Higashino |
| 2005/0163252 A1 | 7/2005 | McCallister et al. |
| 2005/0220218 A1 | 10/2005 | Jensen et al. |
| 2005/0265470 A1 | 12/2005 | Kishigami et al. |
| 2005/0276317 A1 | 12/2005 | Jeong et al. |
| 2006/0067396 A1 | 3/2006 | Christensen |
| 2006/0109780 A1 | 5/2006 | Fechtel |
| 2006/0109935 A1* | 5/2006 | McQueen et al. ............ 375/340 |
| 2006/0171489 A1 | 8/2006 | Ghosh et al. |
| 2006/0239339 A1 | 10/2006 | Brown et al. |
| 2006/0245765 A1 | 11/2006 | Elahmadi et al. |
| 2006/0280113 A1 | 12/2006 | Huo |
| 2007/0047121 A1* | 3/2007 | Eleftheriou et al. ............ 360/51 |
| 2007/0092017 A1 | 4/2007 | Abedi |
| 2007/0098059 A1 | 5/2007 | Ives et al. |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0189404 A1 | 8/2007 | Baum et al. |
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0075590 A1 | 3/2009 | Sahinoglu et al. |
| 2009/0086808 A1 | 4/2009 | Liu et al. |
| 2009/0122854 A1 | 5/2009 | Zhu et al. |
| 2009/0185612 A1 | 7/2009 | McKown |
| 2009/0213908 A1 | 8/2009 | Bottomley |
| 2009/0220034 A1* | 9/2009 | Ramprashad et al. ........ 375/341 |
| 2009/0245226 A1 | 10/2009 | Robinson et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |

(56) References Cited

U.S. PATENT DOCUMENTS

| | | | |
|---|---|---|---|
| 2010/0074349 A1 | 3/2010 | Hyllander et al. | |
| 2010/0158085 A1* | 6/2010 | Khayrallah | 375/222 |
| 2010/0166050 A1 | 7/2010 | Aue | |
| 2010/0172309 A1 | 7/2010 | Forenza et al. | |
| 2010/0202505 A1 | 8/2010 | Yu et al. | |
| 2010/0202507 A1 | 8/2010 | Allpress et al. | |
| 2010/0208774 A1 | 8/2010 | Guess et al. | |
| 2010/0208832 A1 | 8/2010 | Lee et al. | |
| 2010/0215107 A1 | 8/2010 | Yang | |
| 2010/0220825 A1 | 9/2010 | Dubuc et al. | |
| 2010/0278288 A1 | 11/2010 | Panicker et al. | |
| 2010/0284481 A1 | 11/2010 | Murakami et al. | |
| 2010/0309796 A1 | 12/2010 | Khayrallah | |
| 2010/0329325 A1 | 12/2010 | Mobin et al. | |
| 2011/0051864 A1 | 3/2011 | Chalia et al. | |
| 2011/0064171 A1 | 3/2011 | Huang et al. | |
| 2011/0069791 A1 | 3/2011 | He | |
| 2011/0074500 A1 | 3/2011 | Bouillet et al. | |
| 2011/0074506 A1 | 3/2011 | Kleider et al. | |
| 2011/0075745 A1 | 3/2011 | Kleider et al. | |
| 2011/0090986 A1 | 4/2011 | Kwon et al. | |
| 2011/0134899 A1 | 6/2011 | Jones, IV et al. | |
| 2011/0150064 A1 | 6/2011 | Kim et al. | |
| 2011/0164492 A1 | 7/2011 | Ma et al. | |
| 2011/0170630 A1 | 7/2011 | Silverman et al. | |
| 2011/0188550 A1 | 8/2011 | Wajcer et al. | |
| 2011/0228869 A1 | 9/2011 | Barsoum et al. | |
| 2011/0243266 A1 | 10/2011 | Roh | |
| 2011/0275338 A1 | 11/2011 | Seshadri et al. | |
| 2011/0310823 A1 | 12/2011 | Nam et al. | |
| 2011/0310978 A1 | 12/2011 | Wu et al. | |
| 2012/0051464 A1 | 3/2012 | Kamuf et al. | |
| 2012/0106617 A1 | 5/2012 | Jao et al. | |
| 2012/0163489 A1 | 6/2012 | Ramakrishnan | |
| 2012/0177138 A1 | 7/2012 | Chrabieh et al. | |
| 2012/0207248 A1 | 8/2012 | Ahmed et al. | |
| 2013/0028299 A1 | 1/2013 | Tsai | |
| 2013/0044877 A1 | 2/2013 | Liu et al. | |
| 2013/0077563 A1 | 3/2013 | Kim et al. | |
| 2013/0121257 A1 | 5/2013 | He et al. | |
| 2013/0343480 A1 | 12/2013 | Eliaz | |
| 2013/0343487 A1 | 12/2013 | Eliaz | |
| 2014/0036986 A1 | 2/2014 | Eliaz | |
| 2014/0056387 A1 | 2/2014 | Asahina | |
| 2014/0098841 A2 | 4/2014 | Song et al. | |
| 2014/0098907 A1 | 4/2014 | Eliaz | |
| 2014/0098915 A1 | 4/2014 | Eliaz | |
| 2014/0105267 A1 | 4/2014 | Eliaz | |
| 2014/0105268 A1 | 4/2014 | Eliaz | |
| 2014/0105332 A1 | 4/2014 | Eliaz | |
| 2014/0105334 A1 | 4/2014 | Eliaz | |
| 2014/0108892 A1 | 4/2014 | Eliaz | |
| 2014/0133540 A1 | 5/2014 | Eliaz | |
| 2014/0140388 A1 | 5/2014 | Eliaz | |
| 2014/0140446 A1 | 5/2014 | Eliaz | |
| 2014/0146911 A1 | 5/2014 | Eliaz | |
| 2014/0161158 A1 | 6/2014 | Eliaz | |
| 2014/0161170 A1 | 6/2014 | Eliaz | |
| 2014/0198255 A1 | 7/2014 | Kegasawa | |
| 2014/0376358 A1* | 12/2014 | Eder et al. | 370/216 |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G"D. Forney, Jr., Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Faulkner, Michael, "Low-Complex ICI Cancellation for Improving Doppler Performance in OFDM Systems", Center for Telecommunication and Microelectronics, 1-4244-0063-5/061$2000 (c) 2006 IEEE. (5 pgs).

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

(56) References Cited

OTHER PUBLICATIONS

Int'l Search Report and Written Opinion for PCT/IB2013/01860 dated Mar. 21, 2014.
Int'l Search Report and Written Opinion for PCT/IB2013/01970 dated Mar. 27, 2014.
Int'l Search Report and Written Opinion for PCT/IB2013/01930 dated May 15, 2014.
Int'l Search Report and Written Opinion for PCT/IB2013/02081 dated May 22, 2014.
Al-Dhahir, Naofal et al., "MMSE Decision-Feedback Equalizers: Finite-Length Results" IEEE Transactions on Information Theory, vol. 41, No. 4, Jul. 1995.
Cioffi, John M. et al., "MMSE Decision-Feedback Equalizers and Coding—Park I: Equalization Results" IEEE Transactions onCommunications, vol. 43, No. 10, Oct. 1995.
Eyuboglu, M. Vedat et al., "Reduced-State Sequence Estimation with Set Partitioning and Decision Feedback" IEEE Transactions onCommunications, vol. 36, No. 1, Jan. 1988.

\* cited by examiner

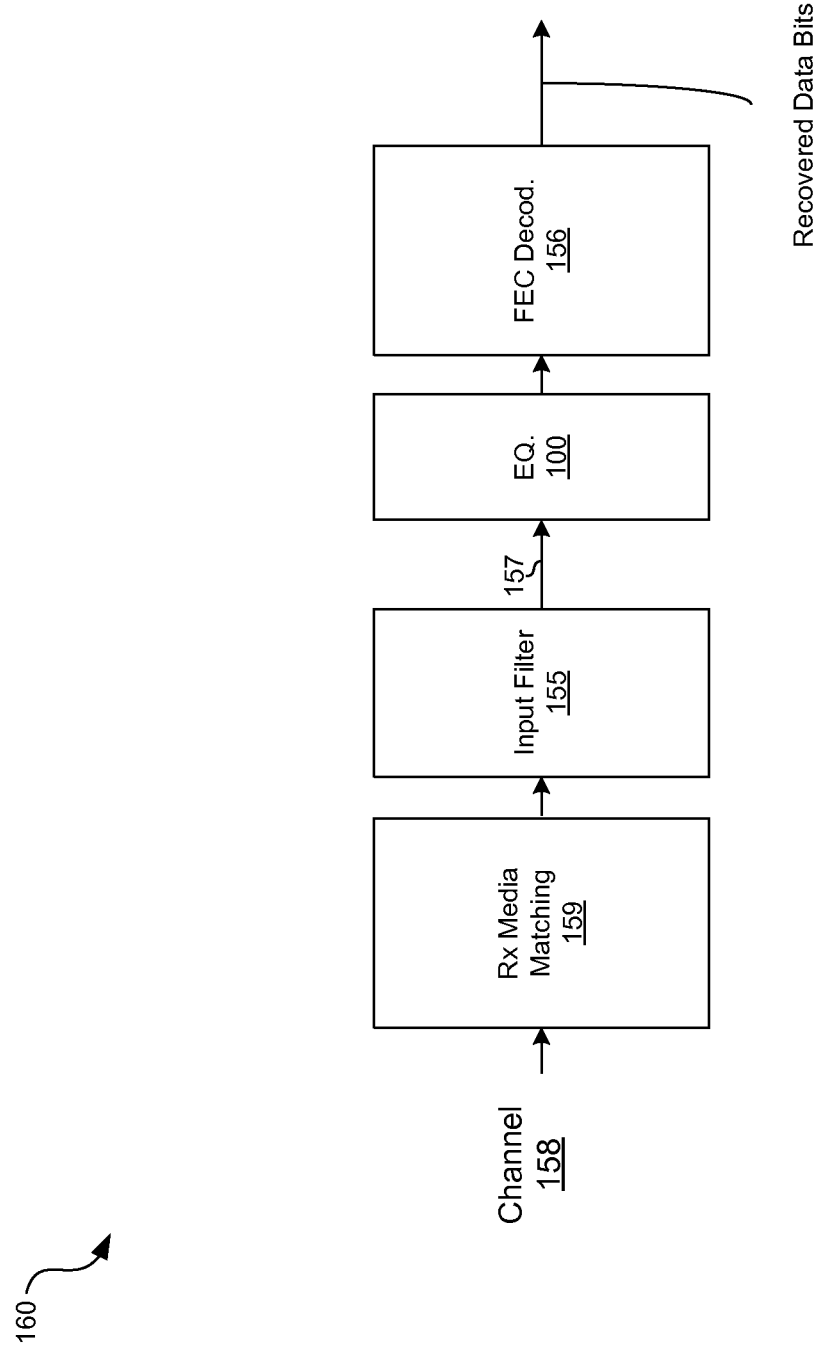

RECEPTION OF INTER-SYMBOL-CORRELATED SIGNALS USING SYMBOL-BY-SYMBOL SOFT-OUTPUT DEMODULATOR

PRIORITY CLAIM

This application claims the benefit of priority to U.S. Provisional Patent Application 61/898,997 filed on Nov. 1, 2013, which is hereby incorporated herein by reference.

INCORPORATION BY REFERENCE

The entirety of each of the following documents is hereby incorporated herein by reference:

U.S. Pat. No. 8,582,637 titled "Low-Complexity, Highly-Spectrally-Efficient Communications;"

U.S. Pat. No. 8,897,387, titled "Design and Optimization of Partial Response Pulse Shape Filter," and filed on Jan. 31, 2013;

U.S. Pat. No. 8,675,769, titled "Constellation Map Optimization For Highly Spectrally Efficient Communications;"

U.S. Pat. No. 8,571,131 titled "Dynamic Filter Adjustment for Highly-Spectrally-Efficient Communications;"

U.S. Pat. No. 8,559,494, titled "Timing Synchronization for Reception of Highly-Spectrally-Efficient Communications;"

U.S. Pat. No. 8,559,496, titled "Signal Reception Using Nonlinearity Compensated, Partial Response Feedback;"

U.S. Pat. No. 8,599,914, titled "Feed Forward Equalization for Highly-Spectrally-Efficient Communications;"

U.S. Pat. No. 8,665,941, titled "Decision Feedback Equalizer for Highly-Spectrally-Efficient Communications;"

U.S. Pat. No. 8,873,612, titled "Decision Feedback Equalizer with Multiple Cores for Highly-Spectrally-Efficient Communications;"

U.S. Pat. No. 8,559,498 titled "Decision Feedback Equalizer Utilizing Symbol Error Rate Biased Adaptation Function for Highly-Spectrally-Efficient Communications;"

U.S. Pat. No. 8,548,097 titled "Coarse Phase Estimation for Highly-Spectrally-Efficient Communications;"

U.S. Pat. No. 8,565,363 "Fine Phase Estimation for Highly Spectrally Efficient Communications;"

U.S. Pat. No. 8,744,003, titled "Multi-Mode Transmitter for Highly-Spectrally-Efficient Communications;"

U.S. Pat. No. 8,605,832, titled "Joint Sequence Estimation of Symbol and Phase with High Tolerance of Nonlinearity;"

U.S. Pat. No. 8,553,821 titled "Adaptive Nonlinear Model for Highly-Spectrally-Efficient Communications;"

U.S. Pat. No. 8,824,599, titled "Pilot Symbol Aided Sequence Estimation for Highly-Spectrally-Efficient Communications;"

U.S. Pat. No. 8,666,000, titled "Reduced State Sequence Estimation with Soft Decision Outputs;"

U.S. Pat. No. 8,571,146 titled "Method and System for Corrupt Symbol Handling for Providing High Reliability Sequences;"

U.S. Pat. No. 8,566,687 titled "Method and System for Forward Error Correction Decoding with Parity Check for Use in Low Complexity Highly-Spectrally Efficient Communications;"

U.S. patent application Ser. No. 13/755,061, titled "Method and System for Quality of Service (QoS) Awareness in a Single-Channel Communication System," and filed on Jan. 31, 2013;

U.S. Pat. No. 8,665,992, titled "Pilot Symbol Generation for Highly-Spectrally Efficient Communications;"

U.S. Pat. No. 8,548,072 titled "Timing Pilot Generation for Highly-Spectrally Efficient Communications;"

U.S. Pat. No. 8,842,778, titled "Multi-Mode Receiver for Highly-Spectrally-Efficient Communications;"

U.S. Pat. No. 8,572,458 titled "Forward Error Correction with Parity Check Encoding for Use in Low Complexity Highly-Spectrally Efficient Communications;"

U.S. Pat. No. 8,526,523 titled "Highly-Spectrally-Efficient Receiver;"

U.S. Pat. No. 8,781,008 titled "Highly-Spectrally-Efficient Transmission Using Orthogonal Frequency Division Multiplexing;"

U.S. Pat. No. 8,737,458 titled "Highly-Spectrally-Efficient Reception Using Orthogonal Frequency Division Multiplexing;"

U.S. Pat. No. 8,831,124 titled "Multi-Mode OFDM Transmitter for Highly-Spectrally-Efficient Communications;" and U.S. Pat. No. 8,681,889 titled "Multi-Mode OFDM Receiver for Highly-Spectrally-Efficient Communications."

BACKGROUND

Zero-ISI signals are usually demodulated by a symbol-by-symbol (either soft- or hard-output) demodulator that, assuming an adequate receiver front end, enjoys the fact that the transmitted symbols do not corrupt earlier or later transmitted symbols at the decision time instants. Inter-symbol-correlated (ISC) signals usually require more involved receivers that carry out sequence estimation. That is, receivers that jointly decide on two or more successive symbols based on the known model of correlation between the successive symbols. These receivers may use the full state-space of the transmitted signal (such as the Viterbi algorithm) or suboptimal search algorithms that employ a partial state-space (such as the M-algorithm or T-algorithm). Limitations and disadvantages of conventional receivers using such algorithms will become apparent to one of skill in the art, through comparison of such approaches with some aspects of the present method and system set forth in the remainder of this disclosure with reference to the drawings.

BRIEF SUMMARY OF THE DISCLOSURE

Aspects of the present disclosure are directed to a method and system for improving the efficiency and performance of digital communications systems that are subject to nonlinear distortion such as amplifier compression, phase noise and Doppler spread.

Various advantages, aspects and novel features of the present disclosure, as well as details of an illustrated embodiment thereof, will be more fully understood from the following description and drawings.

BRIEF DESCRIPTION OF DRAWINGS

FIG. 1A shows a portion of an example receiver front-end in accordance with aspects of this disclosure.

DETAILED DESCRIPTION

Figure 1B:
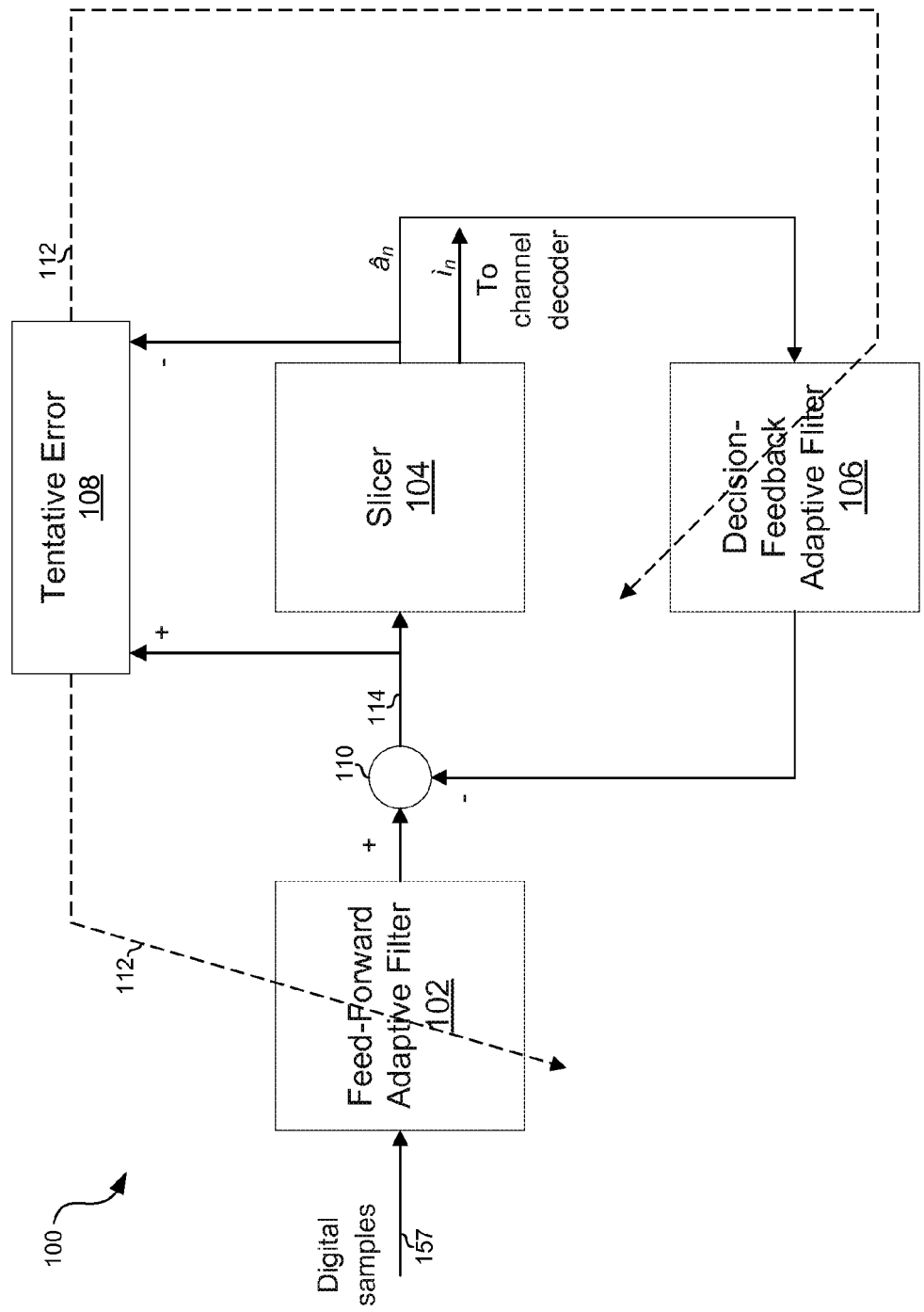
FIG. 1B is a simplified scheme of a symbol-by-symbol receiver with a (decision-feedback) equalizer with either soft decision output.

As utilized herein the terms "circuits" and "circuitry" refer to physical electronic components (i.e. hardware such as transistors, resistors, capacitors, and inductors) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}, that is, one or both of x and y. As another example, "x, y, and/or z" means any element of the seven-element set {(x), (y), (z), (x, y), (x, z), (y, z), (x, y, z)}, that is, one or more of x, y, and z. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Traditional linear modulation schemes such as Pulse Amplitude Modulation (PAM) or Quadrature Amplitude Modulation (QAM) usually use zero-ISI (Inter-symbol Interference) shaping filters. That is, filters that take on a zero value at any integer multiple of the symbol period, t=nT, where n in an integer and T is the symbol period (except for n=0). Zero-ISI signals are generated by filters that obey the so-called Nyquist's Second Criterion, for example, a raised-cosine filter. By contrast, partial response pulse shaping introduces correlation between successive symbols. Such a filter does not introduce nulls at time instants which are integer multiples of the symbol period. The transmit signal generated by such a filter intentionally has a substantial amount of ISI. The ISI is therefore a controlled ISI. It should be noted that a partial response signal is just one example of a type of signal for which there is correlation among symbols of the signal (referred to herein as "inter-symbol-correlated (ISC) signals"). For simplicity of illustration, this disclosure focuses on partial response signals generated via partial response filtering. Nevertheless, aspects of this disclosure are applicable to other ISC signals such as, for example, signals with ISI that was introduced by traversing a linear channel, signals generated via matrix multiplication (e.g., lattice coding), signals generated via decimation as in multi-carrier applications such as in OFDM systems, and signals corrupted by some nonlinear distortion such as phase noise, amplifier compression, time-varying channels, and Doppler spread.

In an example embodiment of the disclosure, a symbol-by-symbol based demodulator is used as a receiver front-end in order to demodulate ISC signals. This front-end decides on the transmitted symbols or generates per-bit soft-values on a symbol-by-symbol basis. The soft-output quantifies the reliability of a decision on a specific bit, that is mapped by the corresponding symbol, as being "0" or "1". Such a demodulator does not maintain a candidate list of symbol sequences.

One alternative for a symbol-by-symbol front-end demodulator for ISC signals may be based on an equalizer that counteracts the inherent correlation between successive symbols. Such an equalizer is based on some (single) symbol-based cost function (such as Minimum Mean Square Error MMSE), or Zero ISI Forcing (ZF)). The equalizer refers to the inherent correlation as it was introduced by the channel, and the cost function that drives it tries to substantially unravel the ISI. The equalizer generates an output at each symbol period and this output is intended to be as close as possible (in the sense of the chosen cost function) to the original transmitted symbol.

FIG. 1A shows a portion of an example receiver front-end in accordance with aspects of this disclosure. The receiver front-end comprises Rx media matching circuit 159, input filter 155, equalizer 100, a forward error correction (FEC) decoder 156.

The channel 158 may comprise a wired, wireless, and/or optical communication medium. The channel 158 may introduce noise which may, for example, be modeled as additive white Gaussian noise (AWGN). The channel 158 may also introduce other non-idealities such as multipath and fading.

The Rx media matching circuit 159 is operable to convert the signal coming from the channel 158 to a digital baseband signal. The Rx media matching circuit 159 may comprise, for example, an antenna (for a wireless channel), an optical to electrical converter (for an optical channel), a low noise amplifier, a down-converter, and/or an analog-to-digital converter.

The input filter 155 is operable to adjust the waveform of the signal received via the channel 158 to generate a signal for further processing in the receiver 130. The input filter 155 may comprise, for example, an infinite impulse response (IIR) and/or a finite impulse response (FIR) filter.

The equalizer 100 is operable to perform equalization functions for the receiver 130. An example implementation of the equalizer 100 is described below with reference to FIG. 1B.

The FEC decoder 156 is operable to implement one or more forward error correction algorithms codewords to detect and/or correct errors in the output of the equalizer 100. Example FEC algorithms include Reed-Solomon (RS), Low Density Parity Check (LDPC), and Turbo Coding.

Reference is now made to FIG. 1B in which there is shown a slicer-based equalizer 100 comprising a feed forward filter 102, a decision feedback filter 106, a slicer 104, a tentative error determination circuit 108 for generating tentative error, and a summing circuit 110. Pre-processed digital samples of the signal 157 are fed to the feed-forward filter 102. The decision-feedback filter 106 is fed past symbol decisions made by the slicer 104. The outputs of both filters are summed by circuit 110. This sum attempts to eliminate the ISI and is "sliced," by slicer 104, to the nearest constellation symbol. The feed-forward filter 102 and decision-feedback filters 106 are adaptive and are tuned in accordance with the error signal 112 determined by error determination circuit 108 as the difference between the signal 114 input to the slicer 104 and its tentative (hard) decision $â_n$. Where a communication system employs a channel code which is amenable to soft-input decoding, the equalizer 100 generates soft-values, $ì_n$, that feed the channel decoder 156. This per-bit soft information, $ì_n$, is based on the symbol decisions taken by the slicer 104 and the slicer input 114. At each symbol period the equalizer 100 generates soft-values for the bits associated with the current symbol decision of the equalizer 100. The soft information per bit is a function of the probability of the bit being "0" or "1". A Log-Likelihood Ratio (LLR) is an example of such soft information, and it is equal to log the ratio of the probability of that bit being "0" and "1". In such a system, the decoder 156 may also generate soft output for the code bits (and not only the information bits). The soft-information may be recycled and updated back and forth between the equalizer and channel decoder in an iterative equalization scheme.

An iterative equalizer is an alternative to a slicer-based equalizer. It is also designed to receive a signal corrupted by ISI. The demodulation/decoding scheme of an iterative equalizer employs iterative message passing between a soft-output equalizer and a soft-input-soft-output (SISO) decoder. It may be applied to both single carrier and multicarrier modulation (such as OFDM). As the message passing policy is bit-based, a receiver using iterative equalization may approach, or try to find, the Maximum A-Posteriori (MAP) solution rather than the Maximum-Likelihood (ML) sequence solution which is associated with a sequence estimation-based receiver. The iterative equalization scheme is based on iterative decoding of a compound code that comprises two constituent encoders. In the iterative equalization scheme the ISI introduced by the channel 158 or transmitter (not shown) is regarded as a code (e.g., convolutional code) as it induces some dependencies between the message bits (like the dependencies in a codeword of a forward-correction code).

Figure 2A:
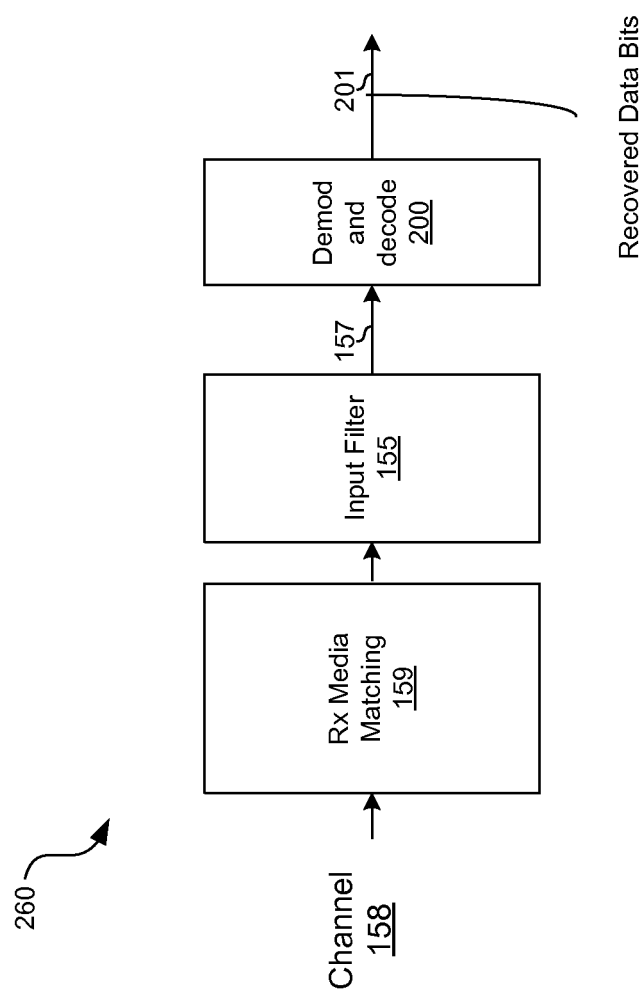
FIG. 2A shows a portion of an example receiver that employs an equalizer and soft-input soft-output channel decoder operating in an iterative-equalization scheme.

FIG. 2A shows a portion of an example receiver that employs an equalizer and soft-input soft-output channel decoder operating in a iterative equalization scheme. Shown again are the channel 158 and the input filter 155. Also shown is demodulation and decoding circuitry 200 which is described below with reference to FIG. 2B.

Figure 2B:
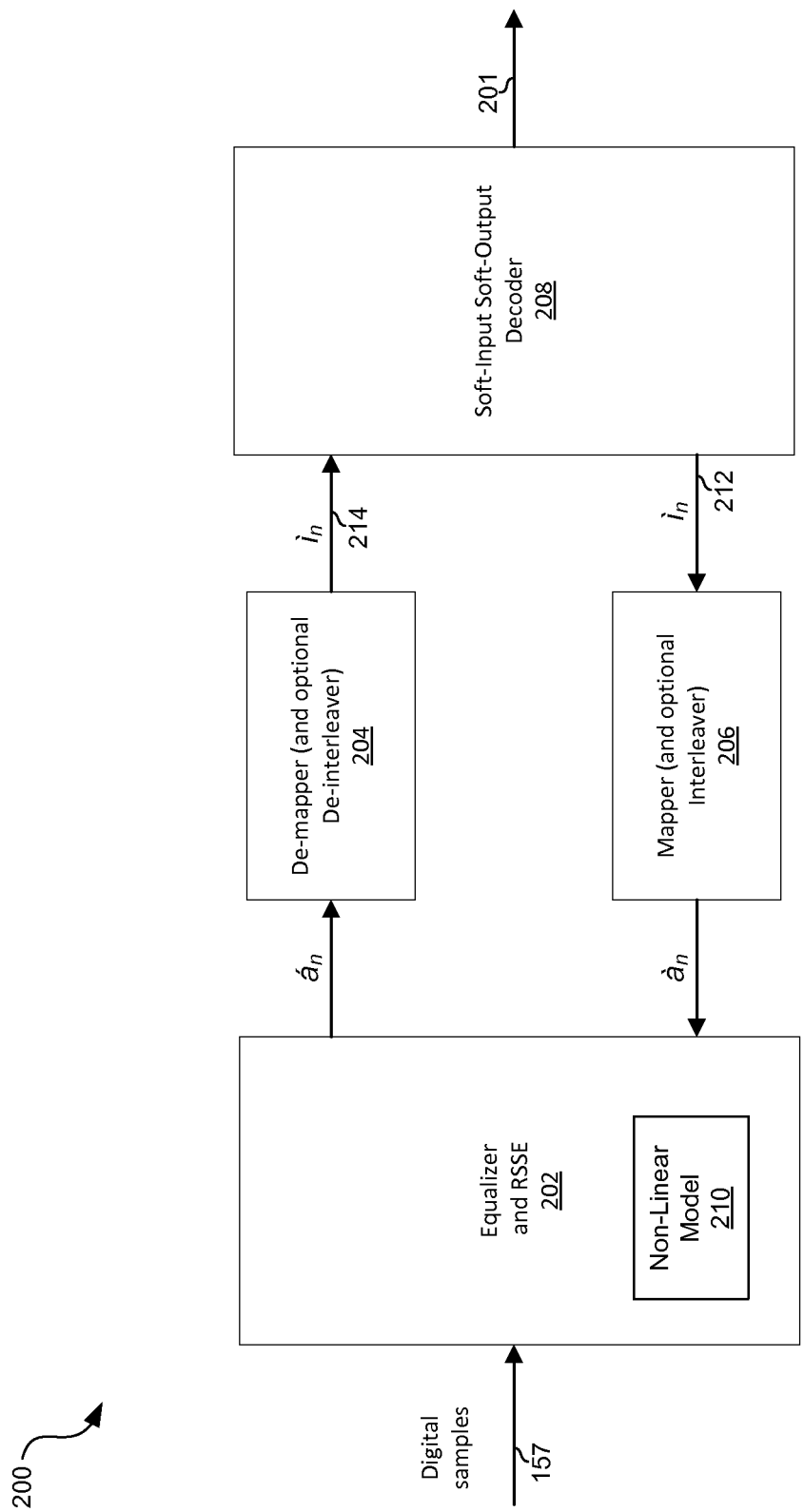
FIG. 2B shows an example implementation of the equalization and decoding circuitry of FIG. 2A.

Now referring to FIG. 2B, the demodulation and decoding circuitry 200 comprises equalization and reduced state sequence estimation (RSSE) circuitry 202, a demapper 204, a mapper 206, and a decoder 208.

Figure 3A:
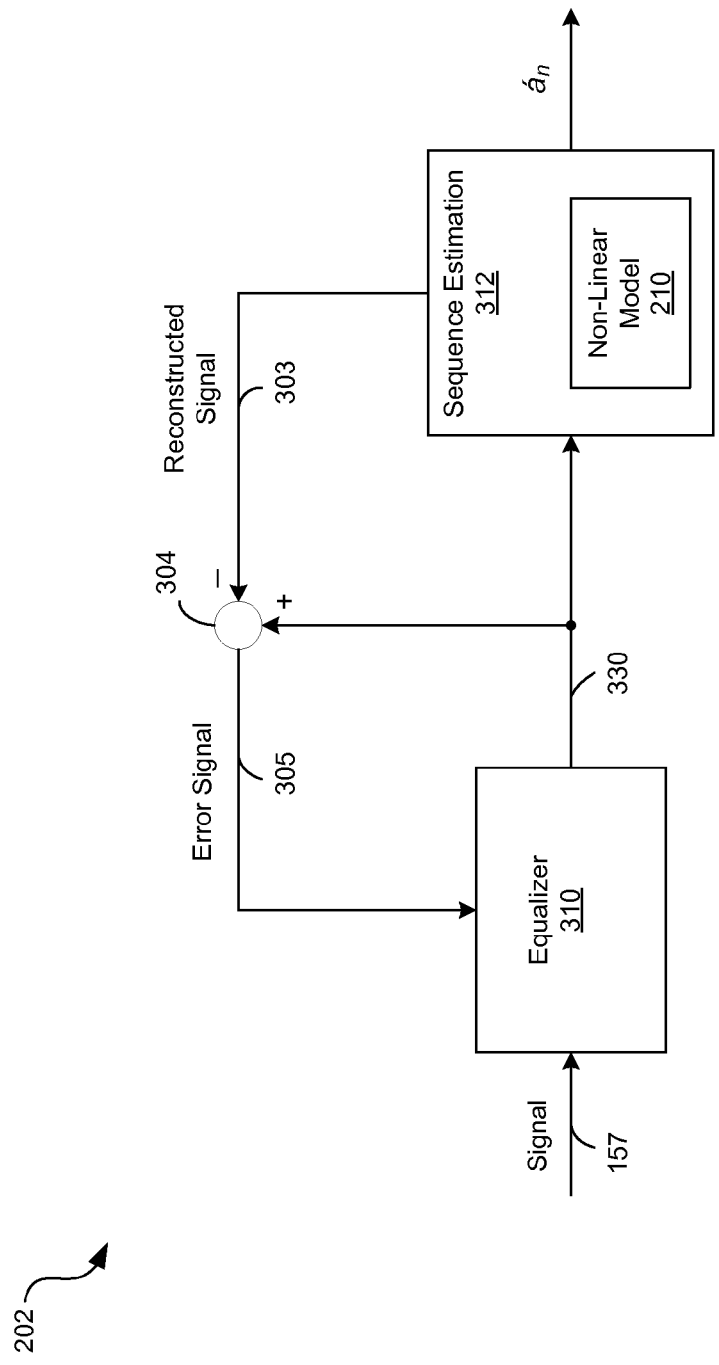
FIG. 3A is a block diagram illustrating an example implementation of equalization and RSSE circuitry.
Figure 3B:
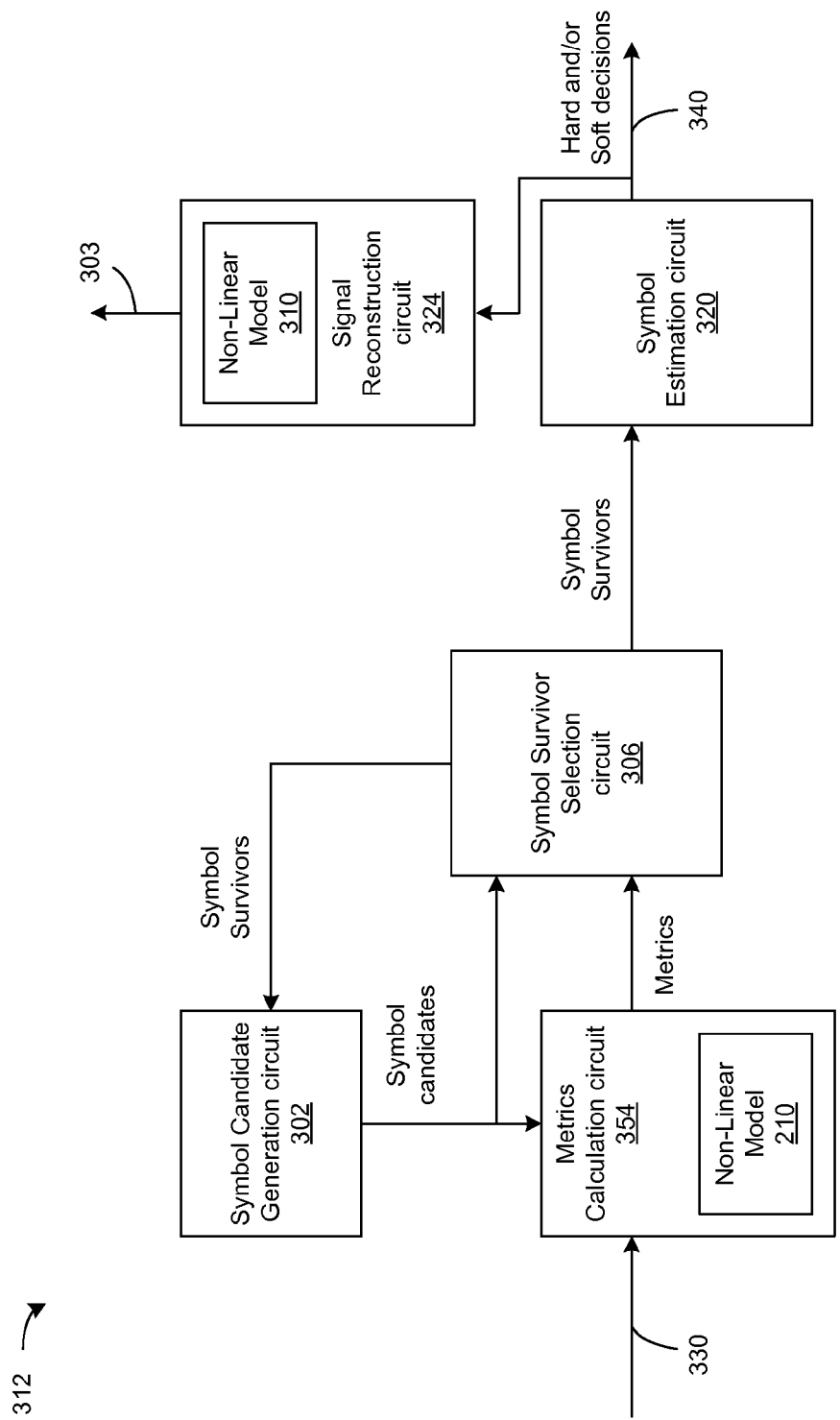
FIG. 3B is a block diagram illustrating an example sequence estimation circuit, in accordance with an embodiment of this disclosure.

An example implementation of the equalization and RSSE circuitry 202 is shown in FIGS. 3A and 3B.

In the example receiver 260 using iterative equalization, the (soft) symbol decision of the equalization and RSSE circuitry 202, $á_n$, is used to generate soft-values, $i_n$, for the bits associated with the current symbol decision of the equalization and RSSE circuitry 202 (similarly to the scheme of FIG. 1B) by de-mapping, via demapper circuit 204, the decision to the constituent bits. In order to spread erroneous bits generated by the inner code, the mapper 206 may perform interleaving of symbols from the decoder 208 prior to mapping. If a similar interleaver is used at the transmitter, the demapper circuit 204 may perform de-interleaving of soft information from the equalization and RSSE circuitry 202 prior to de-mapping. The decoder 208 also yields also soft information regarding the encoded bits (rather than the data bits only). The difference between an iterative equalization and a conventional equalization is the per-bit (or per-symbol) soft-information feedback from the decoder 208 to the equalization and RSSE circuitry 202. The so-called extrinsic information (new information) generated by the decoder 208 is mapped, by mapper circuit 206, back into information about the transmitted symbols, $à_n$, for use in the equalization and RSSE circuitry 202. These estimates, $à_n$, may be either "hard" symbols which are quantized to the constellation grid or soft symbols which are not confined to take on values on the grid. Likewise, the equalization and RSSE circuitry 202 may maintain and update multiple symbol sequences (e.g., multiple equalizers each using a symbol hypothesis) to derive the soft information it passes to the channel decoder. This extrinsic information (basically the difference between the symbol log-likelihood ratio 212 at the output of the decoder 208 and the respective information fed 214 to the decoder 208) is fed into the equalization and RSSE circuitry 202 as (incremental) a priori symbol probabilities. The equalization and RSSE circuitry 202 uses these a priori probabilities in conjunction with the input signal to generate a new estimate of the transmitted symbol (which is again translated by demapper circuit 204 to soft information of the bits associated with that symbol). Iteratively, (new) extrinsic bit information is passed from the equalization and RSSE circuitry 202 to the decoder 208 and, in turn, extrinsic symbol information is passed from the decoder 208 to the equalization and RSSE circuitry 202. The iterative equalizer repeats this iterative process until a predefined stopping profile is met. The information bits at the decoder output at this very last iteration are routed out of the decoder as signal 201.

The above iterative equalization scheme operates on a symbol-by-symbol basis. It extracts the correlation between successive symbols by iterating information back and forth between the decoder 208 and the equalization and RSSE circuitry 202. Instead of taking a joint decision on a sequence of symbols, it aims to reach that optimum decision iteratively. Extrinsic information from the channel decoder 208 propagates through the equalization and RSSE circuitry 202 to improve other symbol decisions.

The iterative equalization scheme may be adapted to capture nonlinear distortion by refining the cost function that drives the equalization and RSSE circuitry 202 to include a nonlinear distortion model 210. The nonlinear distortion model 210 represents/enables reproduction of (to a desired accuracy) the nonlinear distortion present in the received signal being processed in equalization and RSSE circuitry 202. Such nonlinear distortion may have been introduced to the signal in the transmitter from which the signal originated, in the channel 158 over which this signal propagated, and/or the media matching circuitry and/or input filter 155 of the receiver 260. In an example implementation, the nonlinear distortion introduced by the power amplifier of the transmitter may be dominant and the nonlinear distortion model 210 may model the response of the power amplifier. The nonlinear distortion model 210 may be, for example, a logical and/or mathematical expression, a look-up table, and/or any other suitable representation of the nonlinear distortion. Any one or more of a variety of model types may be used, with each model type being characterized by one or more parameters. The model type and/or parameter values may be communicated directly by the transmitter (e.g., during handshaking) and/or may be learned by the receiver by processing signals received from the transmitter (e.g., selection of the model type and/or training of the parameter values may be based on preambles sent by the transmitter). In an example implementation, nonlinear distortion model 210 may comprise an AM/AM parameter whose value is dependent on transmitted signal strength, and an AM/PM parameter whose value is dependent on transmitted signal strength. In such an example implementation, received signal strength may be used as a proxy for transmitted signal strength and the received signal strength may be applied to the look-up table to determine appropriate values of the AM/AM and AM/PM parameters.

Additionally, the soft-values generated by the equalization and RSSE circuitry 202 may be refined to represent the dependency of the estimation reliability on the assessed signal level that may be deduced from the sequence of the symbols estimated by the equalizer. That is, when the signal level of an estimated symbol is relatively high, and thus subject to significant nonlinear distortion (e.g., because of saturation of a power amplifier of a transmitter from which the signal originated), the magnitude of the soft values (LLRs) associated with that signal segment may be reduced to account for this distortion. This refinement may be also carried out at the channel decoder in the absence of interleaver/de-interleaver between the mapper and channel code.

In another embodiment of the present invention, a vector of (soft) symbol decisions, $\underline{x}$, generated on a non-symbol-by-symbol (soft) basis (e.g., using linear programming rather than using sequence estimation based techniques such as the Viterbi algorithm or variants thereof such as the M-algorithm) is iteratively processed, passing it back and forth between equalization and RSSE circuitry 202 and decoder 208 via demapper circuit 204 and mapper circuit 206, by some function $\underline{x}_{n+1} = F(\underline{x}_n)$. In this embodiment, $\underline{x}$ may not be a sequence of legal (sliced) symbol points generated by taking the nearest symbol constellation on the known grid, but rather slicing may be carried out at the end of this iterative process. Alternatively, for coded systems, the vector $\underline{x}$ at the end of the last iteration may be used to derive the per-bit information that feeds the channel decoder. The iterative process may be a gradient algorithm driven by the cumulative error cost. This cost may be the cumulative square difference between the observations and the anticipated signal generated by processing the soft-symbols $\underline{x}$ by the known composite (both linear and nonlinear components) channel model from the symbol mapper in the transmitter from which the signal originated to the receiver. In this embodiment, a preliminary sequence decision built up by a sequence of symbol-by-symbol decisions is used as a starting point for a steepest descent algorithm. This algorithm may result in a good sequence decision when the initial vector point is in the vicinity of the correct sequence.

FIG. 3A is a block diagram illustrating an example implementation of equalization and RSSE circuitry. Referring to FIG. 3A, there is shown an equalizer 310 and sequence estimation circuit 312. The sequence estimation circuit 312 incorporates nonlinear model 210 in the sequence estimation process.

The nonlinear model 210 may comprise, for example, a saturated third order polynomial which may be expressed as $$y = \begin{cases} x \cdot (1 - r \cdot e^{j\varphi} \cdot |x|^2), & x < x_{sat} \\ y_{sat}, & x \geq x_{sat} \end{cases} \quad [1]$$

$$y_{sat} = x_{sat} \cdot (1 - r \cdot e^{j\varphi} \cdot |x_{sat}|^2)$$

where, $x_{sat}$ denotes the input saturation value, $y_{sat}$ denotes the output saturation value, x denotes an input of a nonlinear device or group of devices, y denotes an output of the nonlinear device or group of devices, and $\varphi$ may be set according to a desired/tolerable distortion level. For example, the nonlinear device may be a power amplifier and the x in equation [1] may denote an input voltage level of the power amplifier and the y may denote an output voltage level of the power amplifier. Increased accuracy resulting from the use of a higher-order polynomial for the nonlinear model 210 may tradeoff with increased complexity of implementing a higher-order polynomial. As transmitter's nonlinearity may be the dominant source of nonlinear distortion present in the signal 157, modeling only the transmitter's nonlinearity may be sufficient. In instances where degradation in a receiver's performance is above a certain threshold due to other nonlinearities in the system (e.g., nonlinearity of the Rx media matching circuit 159), the nonlinear model 210 may take into account such other nonlinearities. Equation 1 represents just one example of a nonlinearity model that may be used by the sequence estimation circuit 312 in one or more embodiments of the disclosure.

In an example operation, the equalizer 310 may be operable to process or equalize a signal 157 to reduce, for example, ISI caused by the channel 158. The adaptation of the equalizer 310 may be based on, for example, a least mean square (LMS) algorithm. An error signal 305 is fed back to the equalizer 310 to drive the adaptive equalizer 310. The reference for generating the error signal 305 may be, for example, a reconstructed signal 303 coming from the sequence estimation circuit 312. In an example embodiment of the disclosure, the signal 157 may be an inter-symbol-correlated signal and the reconstructed signal 303 may accordingly also be an inter-symbol-correlated signal. Generation of the reconstructed signal 303 may incorporate the nonlinear model 210 and is described below with reference to FIG. 2B. The error signal 305 is the difference, calculated by a combiner 304, between an equalized signal 330 output by the equalizer 310 and the reconstructed signal 303. The equalized signal 330 is input to the sequence estimation circuit 312. The sequence estimation circuit 312 is operable to generate symbols (estimated symbols) 340, from the signal 330, using the sequence estimation process. The generated symbols $á_n$ may be hard and/or soft estimates of transmitted symbols that resulted in the received signal 157. An example implementation of the sequence estimation circuit 312 is described below with reference to FIG. 3B.

FIG. 3B is a block diagram illustrating an example sequence estimation circuit, in accordance with an embodiment of this disclosure. Referring to FIG. 3B, there is shown an example sequence estimation circuit 312. The example sequence estimation circuit 312 comprises a symbol candidate generation circuit 302, a metrics calculation circuit 354, a symbol survivor selection circuit 306, a symbol estimation circuit 320 and a signal reconstruction circuit 324. The sequence estimation process described with respect to FIG. 3B is an example only. Many variations of the sequence estimation process are possible.

The metrics calculation circuit 354 is operable to generate metrics needed for symbol survivor selections and symbol (including corresponding phase) estimations. Metrics calculations may be executed based on the equalized signal 330 and symbol candidates generated by the symbol candidate generation circuit 302. Each symbol candidate may be a vector comprising, for example, Q candidate symbols (Q is a positive integer). Information associated with the taps of filters via which the signal 157 was processed may also be utilized for the metrics calculation. For example, the tap coefficients may be convolved with the symbol candidates during generation of reconstructed inter-symbol-correlated signal candidates. Furthermore the nonlinear model 210 may be incorporated in the process of generating the reconstructed inter-symbol-correlated signal candidates. For example, the nonlinear model 210 may be applied to the result of the convolution of the symbol candidates with the tap coefficients, the result of the application of the nonlinear model 210 being the reconstructed inter-symbol-correlated signal candidates. The metric value for each of the reconstructed inter-symbol-correlated signal candidates may then be generated based on a cost function (e.g., a squared error function) between the signal 330 and the reconstructed inter-symbol-correlated signal candidates. One or more candidates which have the best metrics level may be selected by the symbol survivor selection circuit 306 for the next iteration of the sequence estimation process.

The symbol survivor selection circuit 306 is operable to perform metrics sorting and selection of a determined number of symbol survivors based on the metrics associated with the symbol candidates. For example, one or more candidates which have the lowest metrics level may be selected from among the symbol candidates. Where the sequence estimation circuit 312 implements a reduced state sequence estimation (RSSE) algorithm, the number of survivors selected by the circuit 306 for the next iteration may be smaller than the size of the corresponding Maximum Likelihood state space. For example, for M-QAM and channel response length L, the number of survivors selected for the next iteration may be less than $M^{(L-1)}$. Each symbol survivor may also be a vector comprising, for example, Q candidate symbols (Q is a positive integer). Each element of each symbol survivor may comprise a soft-decision estimate and/or a hard-decision estimate of a symbol of the signal 330. Besides a newly-detected symbol at a head of the vector, there are (Q−1) symbols in the vector. Some of the (Q−1) symbols could be different than corresponding symbols in a previously-selected symbol survivor (i.e. the sequence estimation may diverge to a different vector). The reliability of the newly-detected symbol may be very low because it may be derived only from the newest signal sample and a first tap of the taps associated with the filter(s) via which the signal 157 was processed, which may have a coefficient that is small in magnitude. The reliability of old symbols toward a tail of the vector may improve along the survived vectors because old symbols are represented by many signal samples (up to effective number of the taps of the total channel response) and thus take advantage of more information. In this regard, the tails (old symbols) of the symbol survivors may converge to the same solution while the head (young symbols) parts of the symbol survivors may be different.

The symbol candidate generation circuit 302 is operable to generate symbol candidates from symbol survivors generated from a previous iteration of the sequence estimation process. For example, for M-OAM (M is a positive integer), there are M symbols in the M-QAM symbol constellation over an I-Q plane. In this regard, generation of the symbol candidates may comprise, for example, duplicating (e.g., (M−1) times) each of the symbol survivors (vectors) generated during the previous iteration of the sequence estimation process, shifting each of the resulting M vectors by one symbol position toward the tail of the vector, and then filling each of the M vacant symbol positions (at the head of the vector) with a symbol from among the M possible symbols in the M-QAM symbol constellation.

The symbol estimation circuit 320 is operable to generate hard and/or soft decisions based on the symbol survivors received from the symbol survivor selection circuit 306. The symbol estimation circuit 320 may comprise one or more buffers to store one or more symbol survivors. In an example implementation, a hard decision output by symbol estimation circuit 320 may be a symbol determined to be the most-likely transmitted symbol corresponding to a sample of signal 330. In an example implementation, a hard decision output by symbol estimation circuit 320 may be a subword determined to be the most-likely transmitted subword corresponding to a sample of signal 330. In an example implementation, a soft decision output by symbol estimation circuit 320 may comprise a plurality of LLRs indicating, for a sample of the signal 330, the respective probabilities of each of a plurality of possible subword values of a FEC codeword. Operation of an example symbol estimation circuit 320 is described below with reference to FIG. 4.

The signal reconstruction circuit 324 is operable to generate the reconstructed signal 303. In an example embodiment of the disclosure, the signal 330 may be an equalized inter-symbol-correlated signal received from the equalizer 310. Information associated with the taps of filters via which the signal 157 was processed may also be utilized for the metrics calculation. For example, the tap coefficients may be convolved with the symbol candidates during generation of reconstructed inter-symbol-correlated signal candidates. Furthermore the nonlinear model 210 may be incorporated in the process of generating the reconstructed inter-symbol-correlated signal candidates. For example, the nonlinear model 210 may be applied to the result of the convolution of the symbol candidates with the tap coefficients, the result of the application of the nonlinear model 210 being the reconstructed inter-symbol-correlated signal candidates.

Figure 4:
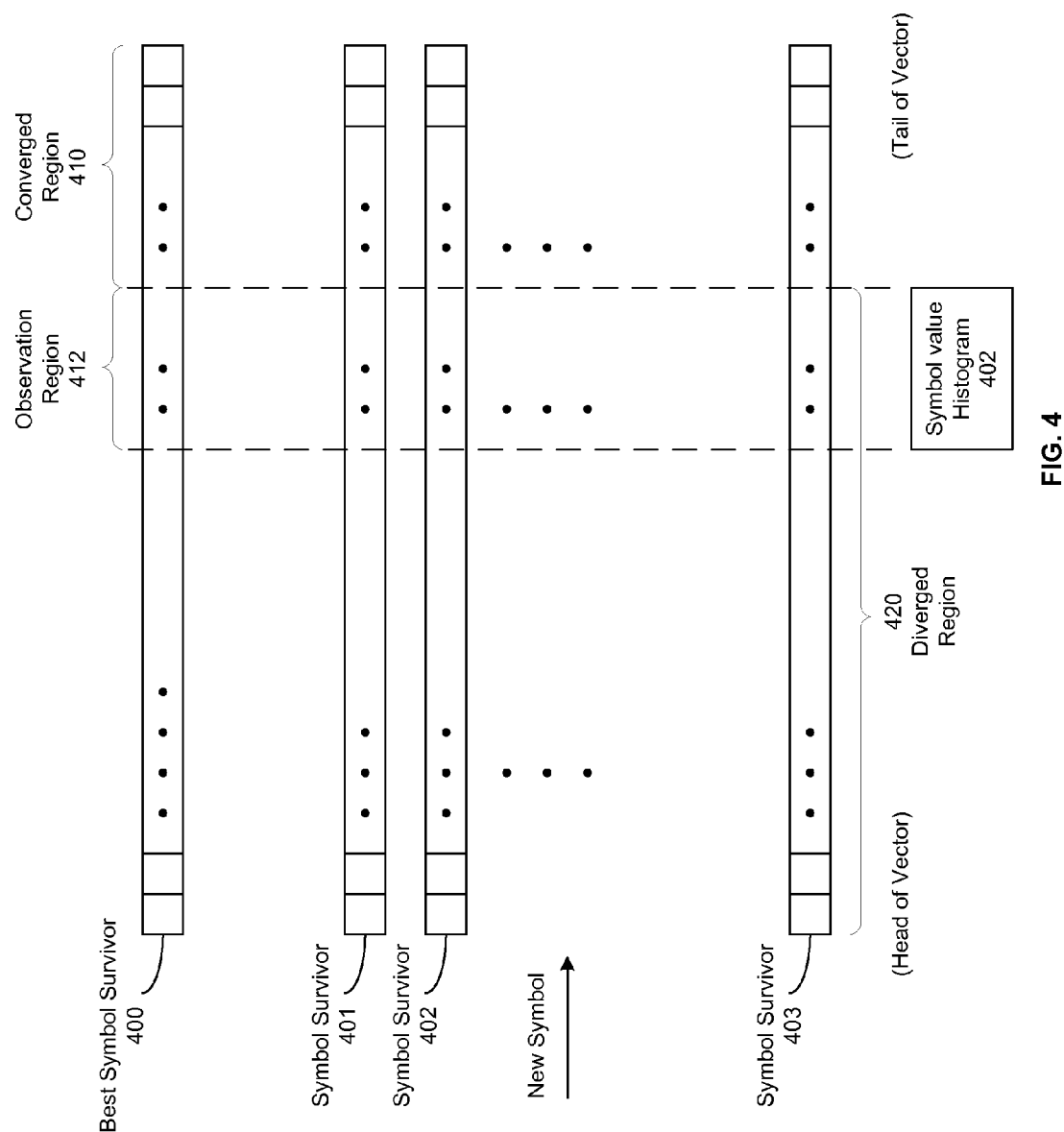
FIG. 4 is a diagram illustrating example symbol survivors, in accordance with an embodiment of the disclosure.

FIG. 4 is a diagram illustrating example symbol survivors, in accordance with an embodiment of the disclosure. Referring to FIG. 4, there is shown a best symbol survivor 400 and a plurality of other symbol survivors, of which symbol survivors 401-403 are illustrated. Each of the symbol survivors 400-403 may comprise a vector of estimated symbol values, the values selected from among the values of a symbol constellation used in generating the signal being demodulated. The length of the vector may be determined, for example, based on the length L of the composite channel model. For example, the length of the vector may be five times the length L. For M-QAM (M is a positive integer), there are a total of M possible symbol values in the M-QAM constellation over an I-Q plane. For example, for a 32-QAM, there are a total of 32 symbol values in the 32-QAM symbol constellation.

There is also shown in FIG. 4, a converged region 410 toward a tail of the vector, a diverged region 420 toward a head of the vector and an observation region 412 which is within the diverged region 420 yet adjacent to the converged region 410. For each iteration of the sequence estimation process performed by the equalization and decoding circuitry 200, a left-most element of each of the symbol survivors 400-403 holds an estimated symbol value for symbol time n, a second element holds an estimated symbol value for symbol time n−1, and so on. Thus, as time progresses, estimated symbol values for particular points in time will shift to the right in the symbol survivors. In other words, "older" estimated symbol values (i.e., value with longer decision delay) are to the right in FIG. 4 and "newer" estimated symbol values (i.e., values with shorter decision delay) are to the left in FIG. 4. Because older estimated symbol values are based on more information (e.g., based on more filter taps) the older estimated symbol values will tend to be the same across the various symbol survivors 400-403 (i.e., the estimated symbol values converge toward the tail of the symbol survivors— hence the "converged" region 410). The converged estimated symbol values will tend to be more accurate/reliable since they are based on more information.

There is also shown in FIG. 4 a block 402 which represents the generation of a histogram based on estimated symbol values within the observation region 412 of the symbol survivors 400-403. Soft decisions à$_n$ may be generated based on the symbol value histogram.

The location of the observation region 412 may be determined (and a corresponding parameter set) based on a trade-off between the diversity provided by the diverged region 420 and the reliability provided by the converged region 410. That is, the location of the observation region 412 may be selected such that the symbol values for the various symbol survivors 400-403 are sufficiently different to provide greater than zero count for more than one symbol value, yet provide sufficiently reliable symbol estimations. The observation region 412 may be a less-diverged sub-region within the diverged region 420 as compared to other (further to the left, in FIG. 4) sub-regions within the diverged region 420.

The depth of the observation region 412 may be determined (and a corresponding parameter set) based on, for example, variability in location of the symbol survivors at which a determined percentage (e.g., 90%) of the symbol survivors converge to the same estimated value for a particular symbol. If, for example, the depth of the observation region 412 is set to one, but located at a position where the estimated values of a particular symbol have already converged, then the histogram will have zero counts for all but one possible symbol value. If, on the other hand, the depth of the observation region 412 is set to one, but the location is at a position where the estimates of a particular symbol are widely divergent, then the histogram may equal counts for multiple possible symbol values. By setting the depth of the observation region 412 to greater than one, some averaging is achieved whereby, even if the estimated values of a particular symbol corresponding to a group of subwords were widely diverged at the front of the observation region 412, and fully converged by the time they reached the tail of the observation region 412 (K iterations of the sequence estimation process later, for a depth of K symbols), the averaging effect may still result in a histogram that provides useful information as to the probabilities of the various possible values for the transmitted constellation symbols.

In accordance with various aspects of this disclosure, a communication system may comprise a transmitter which transmits ISO signals, and a receiver that uses soft-output symbol-by-symbol demodulator for demodulation/decoding of such signals. The demodulator may be operated iteratively to yield the final hard decision or soft per-bit output. The demodulator may uses the estimated/known nonlinear portion of the channel response.

In accordance with various aspects of this disclosure, a communication system may comprise a transmitter which transmits ISO signals, and a receiver that uses iterative equalization for demodulation/decoding of such signals. The receiver may comprise a soft-input soft-output decoder. Information may be iteratively passed from the decoder to the demodulator. The demodulator output may be iteratively processed by some function, which may depend also on the linear and/or nonlinear portions of the channel response.

In accordance with an example implementation of this disclosure, a receiver (e.g., 260) comprises a sequence estimation circuit (e.g., 312), a demapper (e.g., 204), a mapper (e.g., 206), and a soft-input-soft-output (SISO) decoder (e.g., 208). The sequence estimation circuit comprises circuitry operable to generate first soft decisions for symbols of a received inter-symbol-correlated signal (e.g., signal 157). The demapper comprises circuitry operable convert the first soft decisions to corresponding soft bit decisions. The SISO decoder comprises circuitry operable to decode the soft bit decisions to generate corrected soft bit decisions. The mapper comprises circuitry operable to map the corrected soft bit decisions to corrected soft symbol decisions. The circuitry of the sequence estimation circuit is operable to generate, based on the corrected soft symbol decisions, second soft decisions for the symbols of the received inter-symbol-correlated signal, which are improved/refined relative to the first soft decisions. The receiver may comprise a nonlinearity modeling circuit operable to generate a model of nonlinearities experienced by the received inter-symbol-correlated signal. The circuitry of the sequence estimation circuit may be operable to generate a plurality of inter-symbol-correlated symbol candidates through application of the model of nonlinearities to a corresponding plurality of symbol candidates. The circuitry of the sequence estimation circuit may be operable to generate a plurality of inter-symbol-correlated symbol candidates through convolution of each of a corresponding plurality of symbol candidates with tap coefficients of a filter via which the inter-symbol-correlated signal was processed en route to the sequence estimation circuit (e.g., a pulse shaping filter in the transmitter and/or the filter 155 in the receiver). The circuitry of the demapper may be operable to deinterleave the first soft decisions prior to the demapping of the first soft decisions. The circuitry of the mapper may be operable to interleave the corrected soft bit decisions prior to the mapping of the corrected soft bit decisions to the corrected soft symbol decisions. The circuitry of the sequence estimation circuit may be operable to determine a priori symbol probabilities based on the corrected soft symbol decisions. The circuitry of the sequence estimation circuit may be operable to generate the second soft decisions based on the a priori symbol probabilities. The circuitry of the sequence estimation circuit may be operable to generate a plurality of survivor sequences, generate a histogram of symbol or bit values in the plurality of survivor sequences, and determine the first soft decisions based on the histogram. The first soft decisions and the second soft decisions may be represented as log-likelihood ratios.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A receiver comprising:
   a sequence estimation circuit, and a soft-input-soft-output (SISO) decoder, wherein:
      said sequence estimation circuit comprises circuitry operable to generate first soft bit decisions for symbols of a received inter-symbol-correlated signal;
      said SISO decoder comprises circuitry operable to decode said first soft bit decisions to generate corrected soft bit decisions; and said circuitry of said sequence estimation circuit is operable to generate, based on said corrected soft bit decisions, second soft bit decisions for said symbols of said received inter-symbol-correlated signal; and a nonlinearity modeling circuit operable to generate a model of nonlinearities experienced by said received inter-symbol-correlated signal, wherein:

said sequence estimation circuit is operable to generate a plurality of inter-symbol-correlated symbol candidates through application of said model of nonlinearities to a corresponding plurality of symbol candidates.

2. The receiver of claim 1, comprising a mapper and a demapper, wherein:

said demapper comprises circuitry operable convert first soft symbol decisions to said first soft bit decisions;

said mapper comprises circuitry operable to convert said corrected soft bit decisions to corrected soft symbol decisions.

3. The receiver of claim 2, wherein said circuitry of said demapper is operable to deinterleave said first soft symbol decisions prior to said conversion of said first soft symbol decisions to said first soft bit decisions.

4. The receiver of claim 2, wherein circuitry of said mapper is operable to interleave said corrected soft bit decisions prior to said conversion of said corrected soft bit decisions to said corrected soft symbol decisions.

5. The receiver of claim 1, wherein said circuitry of said sequence estimation circuit is operable to determine a priori symbol probabilities based on said corrected soft bit decisions.

6. The receiver of claim 5, wherein said circuitry of said sequence estimation circuit is operable to generate said second soft bit decisions based on said a priori symbol probabilities.

7. The receiver of claim 1, wherein said circuitry of said sequence estimation circuit is operable to:

generate a plurality of survivor sequences;

generate a histogram of symbol or bit values in said plurality of survivor sequences; and determine said first soft bit decisions based on said histogram.

8. A method comprising:

performing in an electronic receiver:

generating, by a sequence estimation circuit of said receiver, first soft bit decisions for symbols of a received inter-symbol-correlated signal;

decoding, by a soft-input-soft-output (SISO) decoder of said receiver, said first soft bit decisions to generate corrected soft bit decisions;

generating, by said sequence estimation circuit and based on said corrected soft bit decisions, second soft bit decisions for said symbols of said received inter-symbol-correlated signal;

generating, by a nonlinearity modeling circuit of said receiver, a model of nonlinearities experienced by said received inter-symbol-correlated signal; and generating, by said sequence estimation circuit, a plurality of inter-symbol-correlated symbol candidates by applying said model of nonlinearities to a corresponding plurality of symbol candidates.

9. The method of claim 8, comprising:

converting, by a demapper of said receiver, first soft symbol decisions to said first soft bit decisions; and converting, by a mapper of said receiver, said corrected soft bit decisions to corrected soft symbol decisions.

10. The method of claim 9, comprising deinterleaving, by said demapper, said first soft symbol decisions prior to said conversion of said first soft symbol decisions to said first soft bit decisions.

11. The method of claim 9, comprising interleaving, by said mapper, said corrected soft bit decisions prior to said conversion of said corrected soft bit decisions to said corrected soft symbol decisions.

12. The method of claim 8, comprising determining, by said sequence estimation circuit, a priori symbol probabilities based on said corrected soft bit decisions.

13. The method of claim 11, comprising generating, by said sequence estimation circuit, said second soft bit decisions based on said a priori symbol probabilities.

14. The method of claim 8 comprising:

generating, by said sequence estimation circuit, a plurality of survivor sequences;

generating, by said sequence estimation circuit, a histogram of symbol or bit values in said plurality of survivor sequences; and determining, by said sequence estimation circuit, said first soft bit decisions based on said histogram.

15. A receiver comprising:

a sequence estimation circuit, and a soft-input-soft-output (SISO) decoder, wherein:

said sequence estimation circuit comprises circuitry operable to generate first soft bit decisions for symbols of a received inter-symbol-correlated signal;

said SISO decoder comprises circuitry operable to decode said first soft bit decisions to generate corrected soft bit decisions; and said circuitry of said sequence estimation circuit is operable to generate, based on said corrected soft bit decisions, second soft bit decisions for said symbols of said received inter-symbol-correlated signal; and a nonlinearity modeling circuit operable to generate a model of nonlinearities experienced by said received inter-symbol-correlated signal, wherein:

said circuitry of said sequence estimation circuit is operable to generate a plurality of inter-symbol-correlated symbol candidates through convolution of each of a corresponding plurality of symbol candidates with tap coefficients of a filter via which said inter-symbol-correlated signal was processed en route to said sequence estimation circuit.

16. The receiver of claim 15, comprising a mapper and a demapper, wherein:

said demapper comprises circuitry operable convert first soft symbol decisions to said first soft bit decisions; and said mapper comprises circuitry operable to convert said corrected soft bit decisions to corrected soft symbol decisions.

17. The receiver of claim 16, wherein said circuitry of said demapper is operable to deinterleave said first soft symbol decisions prior to said conversion of said first soft symbol decisions to said first soft bit decisions.

18. The receiver of claim 16, wherein circuitry of said mapper is operable to interleave said corrected soft bit decisions prior to said conversion of said corrected soft bit decisions to said corrected soft symbol decisions.

19. The receiver of claim 15, wherein said circuitry of said sequence estimation circuit is operable to determine a priori symbol probabilities based on said corrected soft bit decisions.

20. The receiver of claim 19, wherein said circuitry of said sequence estimation circuit is operable to generate said second soft bit decisions based on said a priori symbol probabilities.

21. The receiver of claim 15, wherein said circuitry of said sequence estimation circuit is operable to:
generate a plurality of survivor sequences;
generate a histogram of symbol or bit values in said plurality of survivor sequences; and
determine said first soft bit decisions based on said histogram.

22. A method comprising:
performing in an electronic receiver:
generating, by a sequence estimation circuit of said receiver, first soft bit decisions for symbols of a received inter-symbol-correlated signal;
decoding, by a soft-input-soft-output (SISO) decoder of said receiver, said first soft bit decisions to generate corrected soft bit decisions;
generating, by said sequence estimation circuit and based on said corrected soft bit decisions, second soft bit decisions for said symbols of said received inter-symbol-correlated signal;
generating, by a nonlinearity modeling circuit of said receiver, a model of nonlinearities experienced by said received inter-symbol-correlated signal; and
generating, by said sequence estimation circuit, a plurality of inter-symbol-correlated symbol candidates by convolving each of a corresponding plurality of symbol candidates with tap coefficients of a filter via which said inter-symbol-correlated signal was processed en route to said sequence estimation circuit.

23. The method of claim 22, comprising:
converting, by a demapper of said receiver, first soft symbol decisions to said first soft bit decisions; and
converting, by a mapper of said receiver, said corrected soft bit decisions to corrected soft symbol decisions.

24. The method of claim 23, comprising deinterleaving, by said demapper, said first soft symbol decisions prior to said conversion of said first soft symbol decisions to said first soft bit decisions.

25. The method of claim 23 comprising interleaving, by said mapper, said corrected soft bit decisions prior to said conversion of said corrected soft bit decisions to said corrected soft symbol decisions.

26. The method of claim 22, comprising determining, by said sequence estimation circuit, a priori symbol probabilities based on said corrected soft bit decisions.

27. The method of claim 25, comprising generating, by said sequence estimation circuit, said second soft bit decisions based on said a priori symbol probabilities.

28. The method of claim 22 comprising:
generating, by said sequence estimation circuit, a plurality of survivor sequences;
generating, by said sequence estimation circuit, a histogram of symbol or bit values in said plurality of survivor sequences; and
determining, by said sequence estimation circuit, said first soft bit decisions based on said histogram.

* * * * *